United States Patent Office 2,742,426
Patented Apr. 17, 1956

2,742,426
COMPOSITION FOR HYDRAULICALLY
FRACTURING FORMATIONS

Harold W. Brainerd, Jr., Tulsa, Okla., assignor to Stanolind Oil and Gas Company, Tulsa, Okla., a corporation of Delaware No Drawing. Application July 28, 1952,
Serial No. 301,381

7 Claims. (Cl. 252—8.55)

This invention pertains to an improved composition of matter. More particularly, this invention pertains to an oil-in-water emulsion which is particularly adapted to be used in the Hydrafrac process.

The Hydrafrac process, as disclosed in U. S. Patent 2,596,843, Farris, and elsewhere, is a process for producing fractures in a subterranean formation by the application of a high hydraulic pressure within the well at the elevation of the formation. It has been found highly desirable that the fracturing medium have a low filtrate rate. Since the fracturing medium normally carries a propping agent such as sand, the typical fracturing medium is a gelatinous liquid sufficiently viscous to support the granular propping agent and to provide a low filtrate rate. One of the essential elements of a fracturing liquid is that, after it has been injected into a fracture in a formation, it can be removed, whereby the fracture provides a high permeable conduit from the well a substantial distance back into the rather impermeable formation. Various liquids have been used for this purpose.

It is an object of this invention to provide an improved fracturing liquid which is initially very viscous and which can be easily removed from a formation after a fracture has been produced. It is a more specific object of this invention to provide a highly viscous oil-in-water emulsion containing only a minor amount of water which can be injected into a formation at high viscosity and which can subsequently be removed from the formation at a very low viscosity. These and other objects of this invention will become apparent from the following detailed description.

My improved composition of matter comprises, in brief, a major proportion of a light hydrocarbon liquid emulsified by a non-ionic "surfactant" in a minor proportion of water. The viscosity of this oil-in-water emulsion is increased by the addition of a deliquescent salt. A slow-acting demulsifier is incorporated to reduce the viscosity of the emulsion after a time delay to sustantially the viscosity of the oil prior to emulsification.

In the Hydrafrac process it is highly desirable that any liquid injected into the formation be compatible with the liquid in the formation to prevent contamination of the formation and a corresponding decrease in permeability. That process is, to a large extent, used to fracture oil producing formations so the major constituent in my composition is a light hydrocarbon, typically a hydrocarbon in the boiling range of gasolene, kerosene, naphtha, light fuel oil, crude oil and the like, and mixtures of these hydrocarbons. Heavier hydrocarbons can of course be used. For example, viscous oils in the motor oil range produce satisfactory emulsions, but, due to their greater viscosity, the removal of such viscous oils from a formation after a fracture is produced is more dfficult than the removal of the lighter hydrocarbons. That is, since the viscosity of the liquids in the emulsion return to their initial viscosity after the emulsion is broken, it is considered desirable, but not necessary, that the liquid components of the emulsion composition have an initial viscosity in the lighter hydrocarbon range, typically in the range of 1 to about 10 centipoises or thereabouts. Kerosene is the preferred light hydrocarbon in view of its wide availability, its relatively uniform composition, etc.

The light hydrocarbons are emulsified with water by the use of a non-ionic surfactant, particularly a polyoxyethylene anhydrosorbitol monolaurate containing about twelve ethylene oxide groups per molecule. Anhydrosorbitol is a dehydrated sorbitol and includes both hexitans and hexides. A surfactant of this type, known as Tween 20, is manufactured by the Atlas Powder Company of Wilmington, Delaware. This surfactant is water-soluble and is added to the water phase, either prior to the addition of the hydrocarbon phase or in the presence of a small amount of the hydrocarbon phase. Based upon 100 parts hydrocarbon phase, the water content is preferably in the range of 2.5–40 parts by weight, typically about 5 parts by weight. The surfactant is preferably in the range of 0.2–5 parts, typically 1 part, based on the weight of the hydrocarbon phase. When less than about 2.5 parts of water per 100 parts of kerosene by weight are used, it is sometimes impossible to obtain complete homogeneity in the emulsion; that is, there appears to be insufficient water to emulsify all of the hydrocarbons using ordinary field equipment such as high pressure pumps and the like. The hydrocarbon which is not emulsified then remains as a supernatant hydrocarbon layer on the emulsion and has the viscosity of the hydrocarbon as it was initially added. It is thus generally not desirable to employ less than about 2.5 parts of water per 100 parts of hydrocarbon, but in some cases where an efficient homogenizer is available it may be desirable to use even a lower water concentration. It appears that the higher the ratio of the hydrocarbon to water, providing complete homogeneity is obtained, the more viscous is the emulsion. In my preferred composition, 5 parts water per 100 parts hydrocarbon by weight is used since the emulsion is sufficiently viscous for use in the Hydrafrac process and complete homogeneity is generally obtained.

The viscosity of the emulsion produced by emulsifying the above concentrations of hydrocarbon, water and surfactant generally falls in the range of about 100–500 centipoises. A viscosity in this range is normally considered insufficient to permit the build-up of a high hydraulic pressure in a well, i. e., a pressure sufficient to produce a fracture when injected into a well at a reasonable rate. Accordingly, I add to this emulsion, preferably to the water phase either before the addition of the hydrocarbon phase or in the presence of a small amount of the hydrocarbon phase, a water-soluble ingredient which modifies the surface characteristics of the water phase. The preferred water-soluble ingredient is a deliquescent salt having a metal cation such as lithium, calcium, aluminum, and the like, and a monovalent anion such as chlorine, bromine, iodine and the like. Typical deliquescent salts are calcium chloride, aluminum chloride, magnesium chloride, manganese chloride, calcium iodide and calcium bromide. The amount of this deliquescent salt which is added to the water depends generally upon the amount of the surfactant added to the water. From about equal proportions to about ten times as much deliquescent salt as surfactant is normally preferred. Typically, 3 parts deliquescent salt per 1 part of surfactant is used. The amount of deliquescent salt is somewhat dependent upon the amount of water used; that is, the viscosity increases as the amount of deliquescent salt is increased, but it is generally uneconomical to add more of the salt than will go into solution in the water. As indicated above, the addition of this deliquescent salt appears to modify the surface characteristics of the water phase. In fact, the addition of the deliquescent salt appears to convert the relatively low viscosity emulsion into a highly viscous, grease-like composition having a fibrous structure typical of a soap grease.

A slow-acting or delayed-action demulsifier, i. e., an agent which is capable of breaking the oil-in-water emulsion above described after a suitable period of time, is added to the emulsion for the purpose of reducing its viscosity after a time delay sufficient to inject the emulsion into a formation. The injection of an emulsion after it has been produced down a well and into a formation requires from a few minutes to an hour or more. In a typical well, the maintenance of a high viscosity in a fracturing liquid for about one hour is considered adequate. A slow-acting demulsifier therefore preferably remains substantially inactive, or of only low activity, for about one hour and then commences to break or reduce the emulsion at an accelerated rate. I have found that the addition of a small amount of a water-soluble amine to the above described oil-in-water emulsion permits the emulsion to be injected into the formation before the viscosity of the emulsion is appreciably reduced. After the emulsion is in place, this small amount of a water-soluble amine then reduces the emulsion to its oil and water components which have their initial viscosity. Suitable water-soluble amines for use as slow-acting demulsifiers when incorporated in these emulsions include the methyl, ethyl, propyl and butyl amines, ethanol amine, the cyclic amines such as cyclohexyl amine, aniline and piperidine, the secondary amines such as dibutyl amine, the tertiary amines such as tributyl amine, and combinations of these amines. A preferred slow-acting demulsifier consists of about equal parts of ethyl and ethanol amines. The amount of water-soluble amine incorporated in the emulsion may be varied over a wide range. The amount used depends generally upon the bottom-hole or formation temperature where the demulsifier reacts, the water-solubility of the amine, etc. Preferably, from about 0.5 to about 3 parts by weight of water-soluble amine, based on the weight of the kerosene, is incorporated in the emulsion. 1 part of the preferred 50-50 mixture of ethyl-ethanol amine per 100 parts kerosene has been found satisfactory in most cases to produce the desired reduction of the emulsion. As indicated, very small amounts of the slow-acting demulsifier can be used and the ranges given are merely examples and typical operations. This range can be varied to meet conditions. For example, given a particular oil-in-water emulsion and a particular slow-acting demulsifier, the length of time required for the demulsifier to reduce the emulsion can be varied by varying the amount of demulsifier. It is sometimes desirable to make one or more pilot runs with various concentrations of the demulsifier to determine the breakdown characteristics of the emulsion under well conditions. That is, a small sample can be tested at the surface prior to preparation for a Hydrafrac job to determine the viscosity of the emulsion over a period of time, and the concentration in the demulsifier in the emulsion injected into a well can be controlled accordingly.

In the preparation of my emulsion, I have found it desirable first to add the water-soluble constituents to the water. That is, the polyoxyethylene anhydrosorbitol monolaurate surfactant which is much more easily soluble in the water than in the hydrocarbon, the deliquescent salt, the water-soluble amine and the water are all first added together and mixed so that the solids are in solution and the liquids are evenly dispersed. These may be mixed by circulating the water through a tank by use of a pump, or the materials may all be added to a container and mixed together by stirring in the container. In some cases a small amount of the hydrocarbon, typically a volume equal to the volume of the water, may be added to the container and mixed with the water and water-soluble components to produce a low-viscosity emulsion. After the water and water-soluble ingredients are properly mixed, or after a low viscosity emulsion is produced by mixing the water and a small amount of hydrocarbons, additional hydrocarbons are added to the mixture slowly as the mixture is further agitated. This addition of hydrocarbons produces an increased viscosity, apparently due to mechanical crowding of the growing number of hydrocarbon particles in the emulsion. The hydrocarbons are added slowly, depending upon the type of agitator available, the important element being that the hydrocarbon phase and the emulsion phase are present together in the homogenizer at the zone of rapid shear. In some cases it will be apparent that all of the ingredients, including all of the oil and water, can be mixed at the same time, but in some cases, particularly in field operations where only a high pressure pump is available for homogenization of the mixture, the slow addition of the hydrocarbons has been found highly desirable. When all of the hydrocarbons are emulsified, the viscosity of the emulsion is preferably in the range of 2000-5000 centipoises or higher. In fact, an emulsion having greater than about 5000 centipoises by the Gardner mobilometer is easily produced using the ranges of constituents above specified. When the emulsion has attained substantially its greatest viscosity, the propping agent is added and the slurry is injected immediately into the well. In accordance with the usual procedure used in the Hydrafrac process, a high pressure is then applied to the emulsion to fracture a formation and inject the emulsion into the fracture. After all of the emulsion, which may or may not contain a quantity of propping agent as disclosed in the above-mentioned Farris patent, has been injected into the formation, the emulsion is permitted to stand in the formation for a time sufficient to permit it to break and for its viscosity to be reduced to substantially the viscosity of the water and for hydrocarbons prior to emulsification. This reduction in viscosity permits the fracture to close down on the propping agent, binding it in the fracture so that it cannot be produced back into the well when the well is produced. It appears that after the emulsion is broken the surfactant may be deposited on the hydrophilic sand grains, making them preferentially oil wettable so that the oil particles are more easily displaced through the pores of the rocks. The constituents of the emulsion then having a viscosity in the same range as the connate fluid in the formation are produced with the connate fluids as the well is produced.

Using the procedure described above and as an example of the characteristics of my fracturing fluid, an emulsion was prepared which had the composition set out in the following Table I:

TABLE I

| Constituent: | Quantity |
|---|---|
| Kerosene | gals 750 |
| Surfactant (Tween 20) | lbs 50 |
| Diethyl amine | lbs 50 |
| Calcium chloride | lbs 150 |
| Water | gals 37.5 |

These constitutents were emulsified using a tank and circulating pump, the kerosene being added slowly after partial emulsification. The initial viscosity was greater than 5000 centipoises by the Gardner mobilometer. The viscosity of the emulsion, by surface indications, had been reduced to about 4000 centipoises after about twenty-five minutes, when all of the emulsion was in the fracture, which was at a depth of about 6000 feet. From the sample retained at the surface under bottom-hole pressure conditions, the viscosity of the emulsion in the fracture had been reduced to about 20 centipoises within twenty-four hours. The emulsion subsequently was completely reduced to the viscosity of the kerosene and water. A sample of the emulsion containing no slow-acting demulsifier retained its initial viscosity of greater than 5000 centipoises for several weeks. In fact, the emulsion appears to be permanent or indefinitely stable.

Aluminum chloride is a particularly desirable deliquescent salt for use in my fracturing liquid. As an example of an emulsion produced with this deliquescent salt, 100 parts kerosene, 5 parts water and 1 part surfactant (Tween 20) were emulsified. The emulsion had a viscosity of about 300 centipoises. Three parts anhydrous aluminum chloride were then added to the emulsion. The viscosity versus time for this emulsion is indicated in the following Table II:

TABLE II

| Time in minutes: | Viscosity, centipoises, at 140° F. |
|---|---|
| 0 | 5000+ |
| 5 | 4900 |
| 10 | 4500 |
| 15 | 3500 |
| 17 | 3300 |
| 27 | 3000 |
| 100 | 2250 |

Whereas the emulsion produced by most deliquescent salts remains permanent without the addition of a demulsifier, in the case of the aluminum chloride no additional demulsifier is necessary. I have found that with the aluminum chloride in solution in the water with the surfactant, the viscosity of the emulsion is gradually reduced to the viscosity of the kerosene as indicated in Table II. The reason for this slow breakdown of the emulsion and the reduction without a separate demulsifier is not definitely known. It is believed, however, that the aluminum chloride and water in the presence of the other constituents of the emulsion produce dilute hydrochloric acid which hydrolizes the surfactant or the surfactant-deliquescent salt complex. After the surfactant or complex is hydrolized, the oil particles start to coalesce and eventually the emulsion is completely reduced to its two immiscible liquid constituents. Examples of the viscosity versus time relationship for other emulsions employing different slow-acting demulsifiers are set out below:

*Example 1*

| Constituent: | Parts by weight |
|---|---|
| Kerosene | 100 |
| Water | 5 |
| Calcium chloride | 2.5 |
| Surfactant (Tween 20) | 1 |
| Diethyl amine | 1 |

| Time in minutes: | Viscosity, centipoises, at 140° F. |
|---|---|
| 0 | 5000+ |
| 10 | 4700 |
| 15 | 4450 |
| 17 | 4000 |
| 27 | 3750 |
| 40 | 3700 |

*Example 2*

| Constituent: | Parts by weight |
|---|---|
| Kerosene | 100 |
| Water | 5 |
| Calcium chloride | 2.5 |
| Surfactant (Tween 20) | 1 |
| Cyclohexyl amine | 0.5 |

| Time in minutes: | Viscosity, centipoises, at 140° F. |
|---|---|
| 0 | 4850 |
| 17 | 4000 |
| 27 | 3900 |
| 30 | 2600 |

From the foregoing, it can been seen that an emulsion can be produced having a very high initial viscosity, and that the emulsion can be reduced within a few hours to a low viscosity. These properties render my emulsion particularly suited to the Hydrafrac process. The composition obviously has many other applications where temporary viscosity is desired. Therefore, while the invention has been described by reference to certain specific examples, and particularly the Hydrafrac process, it is not so limited. Instead, the invention should be construed to be limited only by the scope of the appended claims.

I claim:

1. A composition for fracturing a formation in a well comprising an emulsion of a major proportion of liquid hydrocarbons and a minor proportion of water, sufficient surfactant consisting of a polyoxyethylene anhydrosorbitol monolaurate containing about 12 ethylene oxide groups to the molecule to produce a stable oil-in-water emulsion having a viscosity greater than about 100 centipoises on the Gardner mobilometer, sufficient deliquescent salt to increase the viscosity of said emulsion to greater than about 2000 centipoises on the Gardner molibometer, and sufficient water-soluble amine to reduce the viscosity of said emulsion to about the viscosity of said hydrocarbons after several hours.

2. Composition for fracturing a formation in a well comprising an emulsion of a major proportion of liquid hydrocarbons and a minor proportion of water, sufficient non-ionic surfactant consisting of a polyoxyethylene anhydrosorbitol monolaurate containing about 12 ethylene oxide groups to the molecule to produce a stable oil-in-water emulsion having a viscosity in the range 100–500 centipoises on the Gardner mobilometer, and sufficient aluminum chloride, first, to increase the viscosity of said emulsion to greater than about 2000 centipoises on the Gardner mobilometer and, second, to reduce the viscosity of said emulsion after a period of several hours to substantially the viscosity of said hydrocarbons.

3. A composition comprising an emulsion of 100 parts of a liquid hydrocarbon and between about 2.5 and 40 parts water, between about 0.2 and 5 parts of an oil-in-water emulsifying agent comprising a polyoxyethylene anhydrosorbitol monolaurate containing about 12 ethylene oxide groups to the molecule, between about 0.5 and 10 parts of a deliquescent salt to increase the viscosity of said emulsion and sufficient water-soluble amine to reduce the viscosity of said emulsion to substantially the viscosity of said hydrocarbon, after a period of several hours.

4. A composition according to claim 3 in which the concentration of said deliquescent salt in said emulsion is about double the concentration of said emulsifying agent.

5. A composition according to claim 3 in which said deliquescent salt is calcium chloride.

6. A composition comprising an emulsion of 100 parts kerosene and about 5 parts water, about 1 part of a polyoxyethylene anhydrosorbitol monolaurate containing about 12 ethylene oxide groups to the molecule to emulsify said kerosene and water, about 3 parts of a deliquescent salt to increase the viscosity of said emulsion and sufficient water-soluble amine to reduce the viscosity of said emulsion to substantially the viscosity of said hydrocarbon, after a period of several hours.

7. A composition for fracturing a formation in a well comprising an emulsion of a major proportion of liquid hydrocarbons and a minor proportion of water, sufficient non-ionic surfactant comprising a polyoxyethylene sorbitan monolaurate containing about 12 ethylene oxide groups to the molecule to produce a stable oil-in-water emulsion having a viscosity in the range 100–500 centipoises on the Gardner mobilometer, sufficient material selected from the group consisting of lithium, calcium, aluminum, magnesium and manganese chlorides to increase the viscosity of said emulsion to greater than about 2000 centipoises on the Gardner mobilometer and sufficient slow-acting demulsifier consisting of a water-soluble amine to reduce the viscosity of said emulsion to substantially the viscosity of said hydrocarbons after a period of several hours.

References Cited in the file of this patent

UNITED STATES PATENTS

| 2,050,932 | DeGroote | Aug. 11, 1936 |
| 2,314,022 | Stone | Mar. 16, 1943 |
| 2,356,205 | Blair | Aug. 22, 1944 |
| 2,596,844 | Clark | May 13, 1952 |
| 2,602,778 | Snyder | July 8, 1952 |
| 2,672,935 | Braunlich et al. | Mar. 23, 1954 |